United States Patent [19]

Hyppanen

[11] Patent Number: 5,341,766
[45] Date of Patent: Aug. 30, 1994

[54] METHOD AND APPARATUS FOR OPERATING A CIRCULATING FLUIDIZED BED SYSTEM

[75] Inventor: Timo Hyppanen, Karhula, Finland

[73] Assignee: A. Ahlstrom Corporation, Noormarkku, Finland

[21] Appl. No.: 973,396

[22] Filed: Nov. 10, 1992

[51] Int. Cl.⁵ .................... B09B 3/00; F22B 1/00
[52] U.S. Cl. .................... 122/4 D; 110/245; 165/104.16; 422/146
[58] Field of Search .............. 122/4 D; 110/245; 165/104.16; 422/146

[56] References Cited

U.S. PATENT DOCUMENTS

| | | | |
|---|---|---|---|
| 4,915,061 | 4/1990 | Garcia-Mallol | 122/4 D |
| 4,951,612 | 8/1990 | Gorzegno | 122/4 D |
| 5,025,755 | 6/1991 | Eickvonder et al. | 122/4 D |
| 5,040,492 | 8/1991 | Dietz | 122/4 D |
| 5,060,599 | 10/1991 | Chambert | 122/4 D |
| 5,069,170 | 12/1991 | Gorzegno et al. | 122/4 D |

*Primary Examiner*—Edward G. Favors
*Attorney, Agent, or Firm*—Nixon & Vanderhye

[57] ABSTRACT

In association with a circulating fluidized bed reactor, a bed of particles is established in the return duce for particles from the particle separator to the combustion chamber. Inlet openings extend from the bed of particles into the combustion chamber, and the height of the particle bed is maintained above the inlet openings a sufficient distance to form a gas seal. The particles in the bed are fludized, and also transporting nozzles are arranged at different levels for transporting the particles from the bed through the inlet openings into the combustion chamber. Heat exhangers (e.g. superheaters) may be provided in the bed to recover heat from the particles.

32 Claims, 3 Drawing Sheets

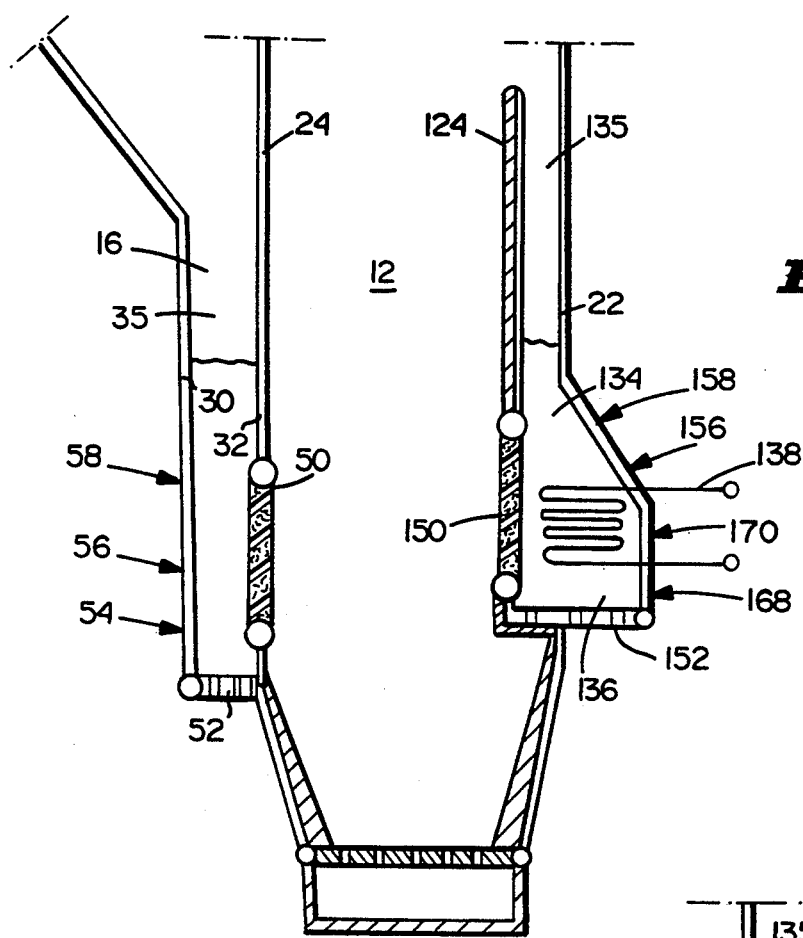
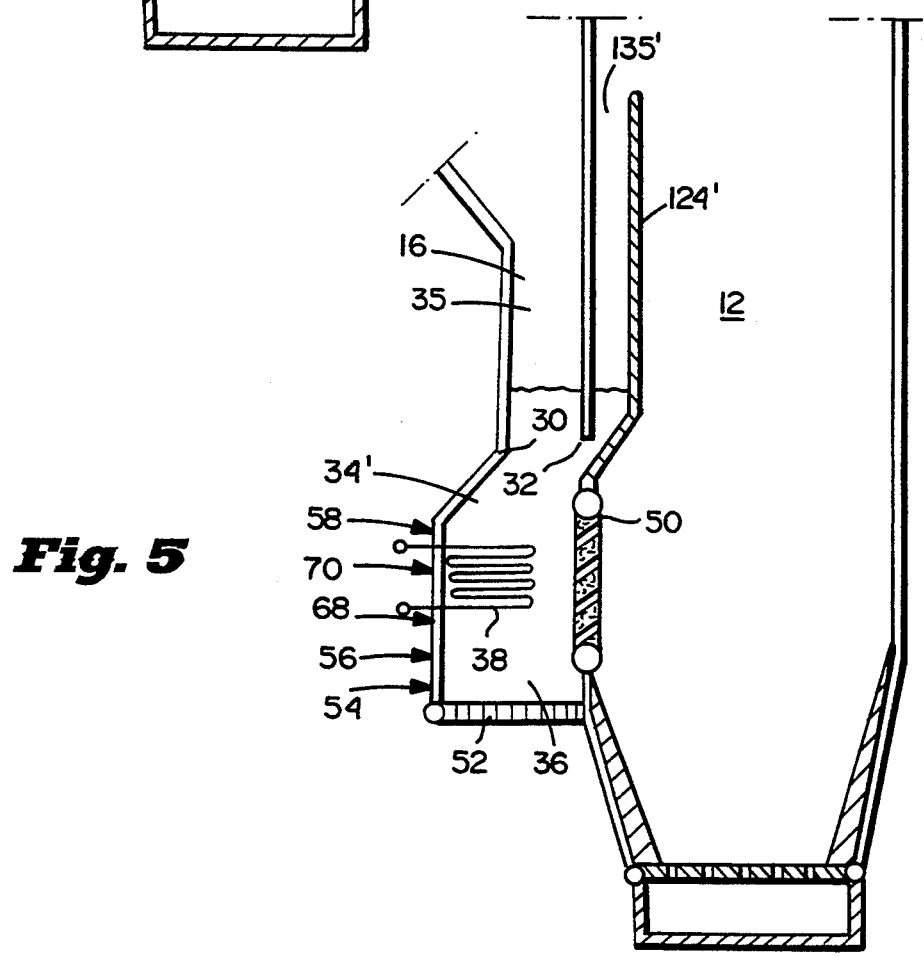

METHOD AND APPARATUS FOR OPERATING A CIRCULATING FLUIDIZED BED SYSTEM

BACKGROUND OF THE INVENTION

This invention relates to a novel method and an apparatus for operating a circulating fluidized bed system.

Circulating fluidized bed (CFB) systems such as CFB combustors include a combustion chamber having a fast fluidized bed of solid particles therein. A particle separator is connected to a discharge opening in the upper part of the combustion cheer, for separating solid particles from the suspension of flue gases and entrained solid material being discharged from the combustion chamber. A return duct is connected between the particle separator and the lower part of the combustion chamber for recirculating separated solid particles from the particle separator into the combustion chamber. A gas outlet is arranged in the particle separator for discharging flue gases.

Cyclone separators are commonly used as particle separators. A dip leg recirculates the separated particles from the cyclone to the lower part of the combustion chamber. A loop seal has to be arranged in the dip leg in order to prevent gases from flowing from the combustion chamber backward into the cyclone therethrough. The loop seal constructions are very large and complicated. It has also been suggested to use L-valves as loop seals. The L-valve is, however, also space consuming, as a rather long connection channel filled with bed material is needed between the return duct and the combustion chamber in order establish a loop seal.

The circulating fluidized bed reactors are used in a variety of different combustion, heat transfer, chemical or metallurgical processes. Depending on the process, different bed materials are fluidized or circulated in the system. In combustion processes particulate fuel such as coal, coke, lignite, wood, waste or peat, as well as other particulate matter such as sand, ash, sulfur absorbent, catalyst or metal oxides can be the constituents of the fluidized bed. The velocity in the combustion chamber usually is in the range of 3,5 to 10 m/s, but can be substantially higher.

Typically heat is recovered from fluidized bed combustion processes by heat transfer surfaces in the combustion chamber and in the convection section arranged in the gas pass after the particle separator. In circulating fluidized bed (CFB) combustors or boilers the peripheral walls of the combustion chamber are usually made as membrane walls in which vertical tubes are combined by flat plate material or fins to form evaporating surfaces. Additional heat transfer surfaces such as superheaters may be arranged within the upper part of the combustion chamber for superheating the steam.

Additional superheaters as well as reheaters, preheaters and air preheaters are arranged in the convection section. It has also been suggested to forth the return duct of heat transfer surfaces.

The heat transfer surfaces are normally designed to give optimal superheated steam also at a low load range. At higher loads steam production is then controlled by spraying water in the convection section.

Superheating at low load often constitutes a problem. The combustion chamber exit gas temperature decreases with decreasing load and the superheaters in the convection section do not have enough capacity to provide the desired results. Additional superheaters arranged in the combustion chamber would increase costs and control problems in the boiler improperly. Additional heat transfer surfaces within the combustion chamber would further decrease the temperature of the flue gases, which still contain unburned fuel, to e.g. 700° to 750° C., which would have an negative effect on NOX and $N_2O$ reduction.

Additional separate heat transfer surfaces within a fluidized bed would on the other hand also be exposed to the high velocity (3-10 m/s or even higher) flow of gas and particles therein. Corrosion and erosion would cause sever problems. Any heat transfer surface arranged within the combustion chamber would have to be made of heat resistant material, most probably also protected by some erosion resistant material. Such heat transfer surfaces would thus become very heavy and expensive. The corrosion constitutes a severe problem in the gas atmosphere in the combustion chamber, when burning fuels containing gaseous chlorine and alkali components.

Especially in pressurized applications it is even less desirable to have to add heat transfer surfaces and increase the size of the combustor, which leads to a need to increase the size of the pressure vessel, as well. In pressurized applications, having smaller combustion chambers, heat transfer surfaces are already very close to each other. It would therefor be very difficult to add any additional heat transfer surface into the combustion chamber. A very compact arrangement of heat transfer surfaces also prevents horizontal mixing of bed material within the combustion chamber and results in decreased combustion efficiency. Besides space problems, clogging may also become a problem if heat transfer surfaces are arranged very close to each other.

It has been suggested to use external heat exchangers (EHE) for increasing the superheating capacity. In such superheaters in a separate fluidized bed of hot circulating solid material, the solid material is introduced into the EHE from the particle separator. The suggested external heat exchangers would be large and expensive as well as difficult to control independently from the main combustion process. Erosion would also constitute a problem when exposing heat transfer surfaces to a fluidized bed of large hot particles. Further at very low loads the amount of solid material being discharged with the flue gases from the combustion chamber and introduced in the EHE would decrease to such a level that superheating could be achieved. A simpler and less expensive solution is needed.

It is an object of the present invention to provide a method and an apparatus for operating circulating fluidized bed systems in which the above mentioned drawbacks are minimized.

It is especially an object of the present invention to provide an improved loop seal arrangement for circulating fluidized bed systems.

It is further an object of the present invention to provide an improved method for heat recovery in circulating fluidized bed systems.

It is still further an object of the present invention to provide an improved method for controlling the heat recovery in a circulating fluidized bed system.

It is thereby also an object of the present invention to provide an improved method for superheating of steam in a circulating fluidized bed boiler system, at different load conditions.

SUMMARY OF THE INVENTION

According to the present invention there is provided a method of operating a CFB system comprising the steps of
- establishing a fast fluidized bed of solid particles in the combustion chamber so that a suspension comprising flue gases and solid particles entrained therein is caused to flow upwardly in the combustion chamber,
- collecting solid particles separated from said suspension,
- directing the collected solid particles into a recycling duct, having an inlet for solid particles in its upper part and being connected via inlet means with the lower part of the combustion chamber,
- establishing a bed of solid particles in the recycling duct, for preventing gases from the combustion chamber from flowing through the inlet means into the recycling duct, and
- introducing transporting gas into the recycling duct, for recycling particles from the bed through the inlet means into the combustion chamber, thereby recycling particles from the recycling duct through two or more superimposed openings, constituting a gas seal.

The particles are preferably directly recycled into the combustion chamber, but can, if needed, be recycled into an intermediate chamber which has further connection with the combustion chamber.

According to one preferred embodiment of the invention particles are collected in a particle separator and recycled into the combustion chamber through a return duct, forming the recycling duct of the invention. A slowly bubbling bed of particles is established in the lower end of the return duct, from which particles are continuously introduced through inlet conduits into the combustion chamber. The bed in the return duct constitutes a loop seal for preventing combustion gases from flowing backwards from the combustion chamber through the inlet conduits into the return duct.

The bed in the return duct is formed of particles circulating in the CFB system. Particles circulating in the system have a smaller particle size distribution than the mean size distribution of the total mass of particles in the system. The bed moves slowly downwards as solid material therefrom is reintroduced into the combustion chamber and new solid material is continuously added on top of the bed. The height of the bed may be controlled by controlling the reintroduction of solid material therefrom into the combustion chamber.

Solid material is according to the invention reintroduced into the combustion chamber with the help of transporting gas through two or several inlet openings or inlet conduits connecting the lower parts of the return duct preferably directly with the combustion chamber. Thereby two or preferably several horizontal or inclined slot like openings or conduits on top of each other constitute a connection between the return duct and the combustion chamber. The slot like openings also constitute a gas seal.

The transporting gas is introduced into the bed in the return duct at locations from which it can mainly flow towards the inlet conduits and not to the upper part of the return duct. The gas flow thereby transports particles from the bed through the inlet conduits into the combustion chamber. The inlet conduits are preferably located in the return duct at a level substantially lower than the upper surface of the bed, so that the bed portion above the inlet conduits is sufficient to prevent gases from flowing upwards into the return duct. The higher the bed the higher is the pressure difference forming the loop seal preventing gases from flowing backwards through the return duct into the particle separator.

Transporting gas may be introduced through nozzles in the bottom of the return duct or through nozzles at different levels in the side walls of the return duct. It is possible to control the recirculation of particles into the combustion chamber by controlling the amount of gas introduced at different locations. Transporting gas introduced through nozzles in the bottom of the return duct will mainly transport particles through the lowermost inlet conduits, whereas transporting gas introduced through nozzles higher up will transport particles through inlet conduits higher up in the return conduit. It is also possible to transport particles horizontally or in other desired directions.

Air from the windbox or air from a separate blower, at a slightly higher pressure, or some other cheap gas, e.g. recycled flue gas, may be used as transporting gas. Inert gases could also be used especially if inert, non-oxidizing conditions are needed.

According to a preferred embodiment of the invention, the inlet conduits comprise several slot like conduits or openings formed on top of each other in a free like construction arranged in a common wall between the return duct and the combustion chamber. The conduits according to the invention, being divided into two or more narrow slot like conduits on top of each other, i.e. having a gill-like structure, can be made with very short length between return duct and combustion chamber, compared to conduits needed in known L-valve loop seals and they can therefor easily be included in a conventional membrane wall construction. Known L-valve loop seals with only one single conventional conduit, having a large cross section especially with a large vertical extension, have to be very long in order to build up enough particles in the conduit to constitute a loop seal and prevent gases from flowing from the combustion chamber into the return duct.

The loop seal effect of an L-valve type inlet conduit depends on the ratio $(h/l)$ between the vertical extension $(h)$ of the conduit and the length $(l)$ of the conduit. This ratio should be $h/l < 0.5$ in order to prevent solids from flowing uncontrollably through the inlet conduit, for keeping a high enough solid surface level in the conduit to prevent gas from flowing backwards through the conduit. The larger the cross section of the conduit the bigger the vertical extension $(h)$ of the opening, i.e. the longer conduit is needed. In inclined conduits, having outlet ends on a higher level than inlet ends, the length $(l)$ of the conduit can be further decreased. The special design of the inlet conduit makes it possible to control the level of bed surface in the return duct and thereby the loop seal effect achieved by the bed.

The inlet conduit or conduits are, according to a preferred embodiment of the present invention, divided into several slot like openings or conduits, having a small vertical extension, arranged on top of each other. Thereby the total vertical extension $h_{tot}$ needed can be divided into $h_1, h_2, h_3 \ldots$, each divided vertical extension being just a fraction of the total $h_{tot}$ needed. The length $(l)$ of each conduit can be decreased in the same proportion as the vertical extension $(h)$, without the loop seal effect of the inlet conduit being decreased. Thereby short inlet conduits, only long enough to extend through a common membrane wall, can be used. This definitely simplifies the construction of the return duct and its connection to the combustion chamber as well as the whole circulating fluidized bed system.

The return duct may according to the present invention be constructed as a very simple channel having a common wall with the combustion chamber. The connection between the return duct and the combustion chamber, which in earlier constructions has been very large and complicated, may now be a simple frame like construction with a set of gill like inlet openings or conduits, in the conventional tube panel wall used in boilers, for reintroducing material into the combustion chamber.

Heat transfer surfaces may, according to a further important embodiment of the invention, be arranged in a heat transfer zone in the recycling or return duct in order to recover heat from the circulating mass of particles in the CFB system, thereby constituting an Integral Heat EXchanger (IHEX) in the return duct.

The heat transfer surfaces are preferably arranged in the bed but may extend upwards beyond the bed. Heat may also be recovered by heat transfer surfaces arranged in the walls of the return duct. The mean size distribution of the particles, flowing from the combustion chamber into the particle separator and therefrom into the return duct, is smaller than the mean size distribution of particles in the combustion chamber, as a larger portion of small particles are entrained with the flue gases than coarse particles. Fine particles, having medium sizes ranging below 500$\mu$, typically 150–250$\mu$ in the return duct provide for a dense bed in the return duct with a very high heat transfer coefficient for particle convection, $k=100-500$ W/m$^2$k.

If heat transfer surfaces are used then the return duct is preferably extended in its lower part, having in the extension part a larger horizontal cross section than in its upper part, thereby providing more space for heat transfer surfaces and the bed of solid particles. Superheating of steam may advantageously take place in the return duct. In CFB systems heat is readily available for superheating in the circulating mass of hot particles. As a further advantage, achieved by arranging superheaters in the return duct, there is no need to unnecessarily cool the flue gases in the combustion chamber and unfavorably decrease temperatures before unburned fuel and ash have been separated from them. The invention thereby provides for good NOX and $N_2O$ reduction in the combustion chamber.

The gas atmosphere in the heat transfer zone in the bed, being very limited and containing mainly clean gas without alkaline, chlorine or other corrosive gaseous components, provides very advantageous conditions for superheating. The superheaters may be heated to much higher temperatures than what normally is the case in corrosive conditions prevailing in the combustion chamber. Steam of up to 500°–550° C. may be produced also when burning corrosive gaseous components containing fuels.

It has especially been a problem in waste/RDF burning boilers to utilize the heat for superheating, due to the dirty gases, containing different kinds of corrosion causing components. The present invention provides a system in which superheater surfaces contacts hot circulating material in a safe gas atmosphere.

Also erosion is minimized in the slowly bubbling bed having gas velocities of <0.5 m/s, e.g. 10 cm/s, whereby particles colliding with the heat transfer surfaces have a very low impact velocity. In combustion chambers in conventional or circulating fluidized beds the velocities are in the range of 0.5 to 50 m/s the particle flow thereby causing severe erosion on additional surfaces therein. Additionally erosion in the present bed is relatively small due to the small particle size of bed material.

The heat transfer from particles to superheater surfaces in the heat transfer zone in the bubbling bed may be advantageously controlled by introducing a fluidizing flow of gas into at least a part of the heat transfer zone, providing movement of particles close to the superheater surfaces. Increased gas flow around the surfaces will increase heat transfer to the surfaces. Gas, such as air or inert gas, may be introduced for heat transfer control through several separate nozzles. The transporting gas may also be used for controlling heat transfer.

The heat transfer may according to the invention be controlled by the location and/or flow rate of gas introduced into different parts of the heat transfer zones.

Very small gas flows are needed for providing a suitable heat transfer. The gas needed may mainly be discharged from the return duct through the inlet conduits together with the transport gas, but may, as the gas flows needed for heat transfer is very small, also be allowed to flow up into the return duct. Especially if heat transfer surfaces are disposed high up in the bed it may be more preferable to let at least some of the gas flow upwardly in the return duct. Normally the height of the bed will prevent gas introduced for heat transfer reasons from flowing upwardly into the particle separator.

It may to some extent be possible to control the heat transfer also by controlling the total height of the bed, especially if a part of the heat transfer surfaces extends above the bed.

Heat transfer zones and inlet conduits may be arranged in the same parts of the return duct or they may be arranged in adjacent parts of the return duct.

According to one embodiment of the present invention heat transfer zones and inlet conduit zones are arranged side by side. Gas flows are introduced into the heat transfer zones for controlling heat recovery and for transporting the recirculated particles through the inlet conduit into the combustion chamber. Transporting gas is preferably also introduced into the heat transfer zones for transporting particles therefrom horizontally towards the adjacent inlet conduit zones and further into the inlet conduits.

The level of the bubbling bed may be controlled by measuring the pressure difference in the return duct between a first preset level below the upper surface of the bed and another second preset level above the upper surface of the bed, the two preset levels being chosen to include therebetween both the actual and optimal levels of the upper surface. The flow of transporting gas discharging particles through the inlet conduits may be controlled according to the pressure difference measured in order to keep the upper surface of the bed at an optimal level.

The present invention provides a very simple CFB boiler construction. The return duct is preferably constructed as a narrow vertical channel having one wall common with the combustion chamber, the wall being e.g. a typical membrane wall used in CFB boilers. The opposite wall may be a similar membrane wall. The inlet conduit connecting the return duct with the combustion chamber may be prefabricated as a frame like construction having several inlet conduits on top of each other. Such a frame structure may easily be connected to a membrane wall on site. There is no need for complicated large conventional loop seal constructions.

The present invention provides a boiler system with a very wide load range. Also in the present new system, at extremely low loads, with a velocity of about 2 m/s in the combustion chamber, too few particles may be entrained with the flue gases to provide the heat transfer capacity needed in the return duct. In these cases and if additional superheating is needed, it may be possible to utilize the particles flowing downwardly along the peripheral walls of the combustion chamber.

The downward flow of particles may be guided into a vertical narrow recycling duct or pocket arranged on a side wall inside the combustion chamber. The pocket is open in its upper end for capturing particles flowing along the wall. The pocket may be formed by arranging a partition wall close to the side wall, the partition wall separating the recycling duct or pocket from the main part of the combustion chamber. The pocket may be formed as the narrow vertical slot like return duct within the combustion chamber. Particles captured by the pocket are allowed to form a bed in the lower part of the pocket, similar to the bed in the return duct. The bed is controlled to flow slowly downwardly in the pocket and to recirculate particles into the main part of the combustion chamber through, e.g., gill type inlet conduits, disposed in a frame like construction on the partition wall. Heat transfer surfaces, preferably superheater surfaces may be disposed in the pocket. Gas nozzles may be arranged in the bottom of the pocket as well as on the sides of the pocket, for controlling recirculation of particles and heat transfer.

Such a pocket construction should be disposed in the combustion chamber at not too high a level, so that enough solid particles still may be collected from the particle flow along the walls above the pocket, at the loads in question, for heat transfer purposes. Superheater surfaces are well protected in the bed in the pocket as the gas atmosphere there is similar to that in the return duct and contains very little corrosive gaseous components.

It is also possible to control the heat transfer by controlled gas flows introduced into the pocket. An inlet conduit construction as described for the return duct provides a loop seal for the pocket, preventing gases from flowing backwards through inlet conduits into the pocket.

Heat transfer may very easily be controlled in this new system. The heat transfer surfaces in the combustion chamber itself may be designed for smaller loads than what has been previously the case. The additional heat, e.g. for superheating, may be obtained by heat transfer surfaces in the pocket and the return duct. This additional heat needed may be controlled by the gas flows in the corresponding heat transfer zones.

At high loads an increased circulating mass of particles increases the heat recovery in the return duct whereas at low loads, as the circulating mass of particles is decreased leading to decreased heat transfer in the return duct, the heat recovery can be increased in the pocket.

In earlier known systems heat transfer surfaces in the combustion chamber have to be designed to secure a satisfactory superheating of steam at low loads also. In order to prevent overheating at high loads in such systems and for controlling the temperature spray nozzles have had to be installed in the convection section. In the present new system spray nozzles are needed only for control of steam temperature during operation not for controlling steam production at different loads.

BRIEF DESCRIPTION OF TEE DRAWINGS

The invention will be described further, by way of example, with reference to the accompanying drawings in which FIG. 1 is a schematical vertical section through a circulating fluidized bed apparatus according to one exemplary embodiment of the invention;

FIG. 2 is a partial cross sectional view of the lower part of the return duct in FIG. 1 taken along line A—A thereof; and FIGS. 3–5 are detail view like that of FIG. 1 for three other exemplary embodiments according to the invention.

DETAILED DESCRIPTION OF THE DRAWINGS

Figure 1:
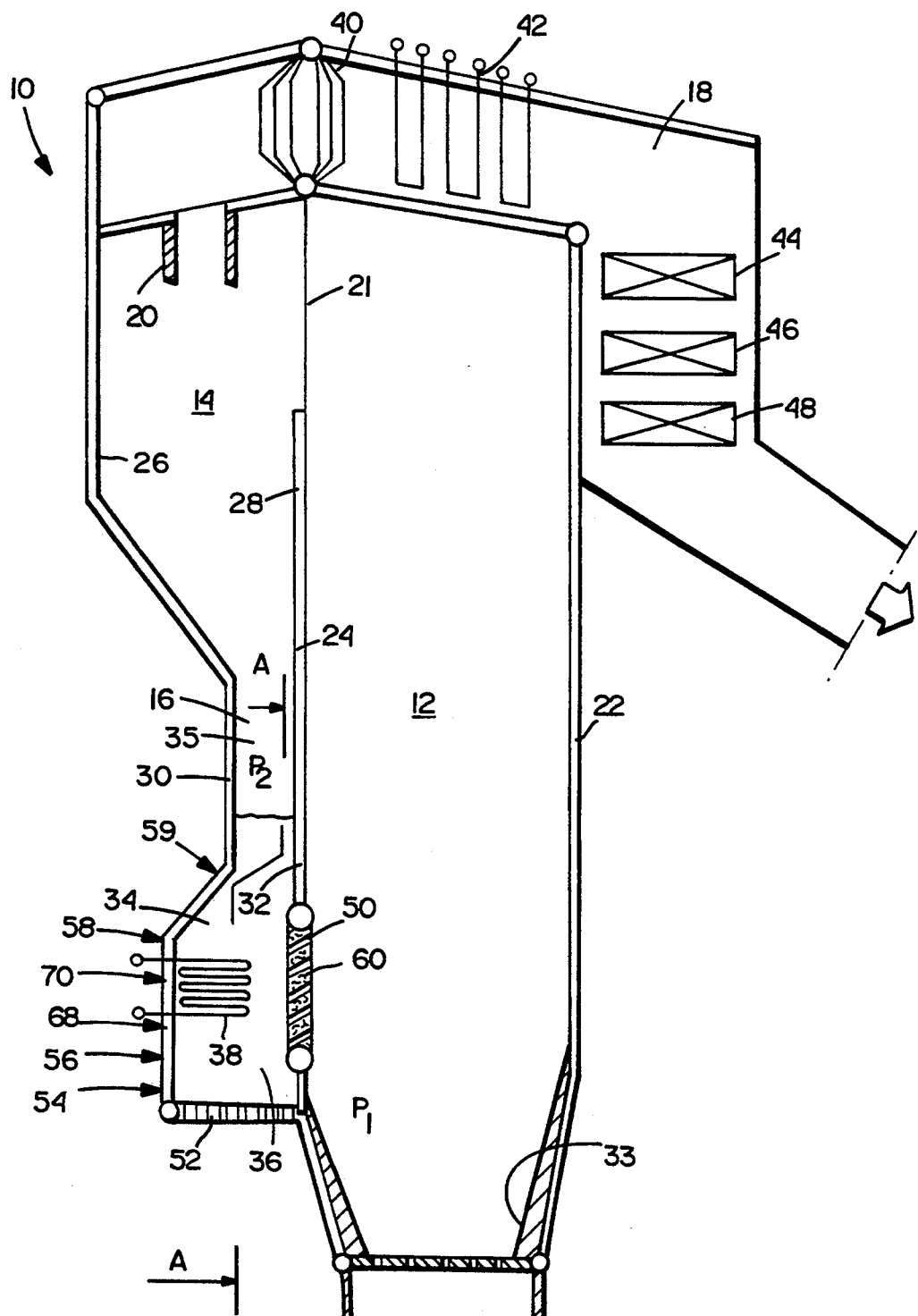

FIG. 1 shows a circulating fluidized bed combustor 10, having a combustion chamber 12 with an expanded fluidized bed of particles therein. A particle separator 14 is connected to the upper part of the combustion chamber 12, for separating particles entrained with the mixture of flue gases and solid material being discharged from the combustion chamber. A return duct 16 is provided for recirculating separated solid material from the separator into the lower part of the combustion chamber. A convection section 18 is connected to a gas outlet 20 arranged in the upper part of the separator 14.

The walls of the combustion chamber 12, of which only walls 22 and 24 are shown in FIG. 1, as well as, the walls 26, 28 of the particle separator 14 and the walls 30, 32 of the vertical channel-like return duct 16, are preferably constructed of water wall panels or membrane panels. Water is evaporated in the membrane walls. The panels in the bottom part of the combustion chamber 12 are protected by a refractory lining 33. Also the panels in the return duct 16 may be partly or completely protected by refractory lining (not shown). In the embodiment shown in FIG.1 the wall 28 in the separator and wall 32 in the return duct form the wall 24 in the combustion chamber.

The lower part 34 of the return duct 16 has a larger horizontal cross section than the upper part 35 of the return duct. A bubbling bed 36 of recycling particles is provided in the lower part 34.

A superheater 38, preferably the last superheater surface in the steam system, is arranged in the bubbling bed 36 for superheating steam produced in the panel walls 22, 24, 26 and 30 in the combustion chamber 12 and the return duct 16. Steam may also be superheated in a superheater 40 in the convection section 18 after the separator 14. Further heat transfer surfaces 42, 44, 46, 48 for reheating, preheating and air preheating are also arranged in the convection section 12.

Figure 2:
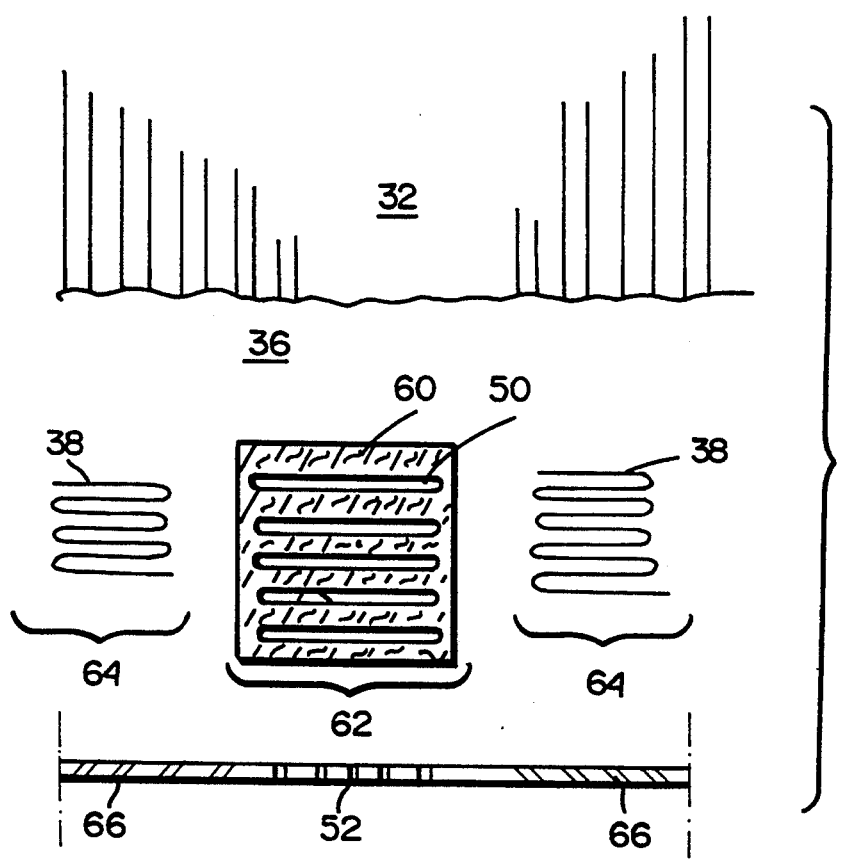

Gill like inlet conduits or openings 50 in a frame like structure 60, shown in FIG.1 and FIG.2 connect the lower part of the return duct 16 with the lower part of the combustion chamber 12. The height of the bed 36

(over openings 50) and the gill like inlet conduit construction 50, 60 constitute a loop seal preventing combustion chamber gases, at a high pressure p1 in the combustion chamber 12, from flowing through the inlet conduits 50 into the return duct 16 and further upwardly to the gas space above the bubbling bed 36 having a lower pressure p2. The height of the bed 36 above inlet conduit 50 should preferably be sufficient to provide a pressure (head) greater than the pressure difference p1−p2.

Transport gas (e.g. air, inert gas, recycled flue gas, or the like) is introduced into the return duct 16 through bottom nozzles 52, which can be conventional nozzles used in fluidized beds. Additional transport gas is introduced through inlets 54, 56, 58 and 59. Transport gas introduced through bottom nozzles 52 transports particles from the lowermost part of the bed towards the inlet openings 50. Transport gas introduced through inlets 54 and 56 mainly transports particles from the middle parts of the bed towards the inlet conduits 50. Transport gas introduced through nozzles 58 and 59 transports particles from the upper part of the bed towards the upper openings of the inlet conduits 50.

By controlling the flow of transport gas through the different nozzles 52, 54, 56, 58, 59 at bottom and side wall locations it is possible to control the amount of particles being reintroduced from the bed 36 into the combustion chamber 12 and thereby the loop seal effect. By increasing the gas flow through the bottom nozzles 52 and correspondingly decreasing the gas flow through side wall nozzles 54, 56, 58, 59 an increased flow of particles is achieved and a decrease in the height of the bed 36. By increasing the gas flow through the uppermost nozzles 58, 59 and decreasing the flow through the bottom nozzles 52, 54 a decreased recirculation of particles is achieved and an increase in the height of the bed 36.

The inlet openings 50 can be grouped in a frame like structure 60 located in an inlet conduit zone 62 in the return duct. Superheaters 38 are located in adjacent heat transfer zones 64. In other embodiments both zones 62 and 64 may overlap.

The frame structure 60 can easily be inserted in a conventional panel wall 32 and the slot like inlet conduits 50 can be prefabricated into the wall when covering the wall with refractory lining. Tubes in the panel wall 32 are normally bent (not shown in Figures) during construction to provide any opening needed for the inlet conduit frame construction 60. A mold, for the slot like openings 50, made of e.g. Styrox or other combustable material is inserted in the opening between the tubes, before covering the panel wall 32 with refractory lining. The mold is burnt away during heating of the refractory lining, leaving only slot like inlet conduits or openings 50 in the wall.

The inlet conduits 50 constitute horizontal or upwardly inclined gill type channels that is slot-like openings disposed one above the other as clearly illustrated in FIGS. 1 and 2. The transporting gas flow nozzles 52 are preferably arranged at a distance from the inlet conduits in order to prevent the gas from flowing directly into the conduits without entraining particles thereby. The distance is preferably at least twice the distance between two inlet openings.

Gas nozzles 66 (see FIG. 2) are also arranged in the bottom of heat transfer zones 64 for providing a gas flow around the heat transfer surfaces 38 and for transporting the particles in the heat transfer zone 64 towards the inlet conduit zone. Additional gas nozzles 68, 70 may be arranged in the heat transfer zone, as shown in FIG.1, at different levels in the wall of the return duct for controlling the heat transfer at different locations in the heat transfer zones 64.

Heat transfer can be controlled by changing the proportion of gas introduced through nozzles 68 and 70, the total gas flow thereby being constant. Heat transfer is increased by increasing the gas flow through nozzles 68 situated below the heat transfer surfaces 38, and decreased by increasing the gas flow through nozzles 70 situated at a higher level above the lowermost heat transfer surfaces 38.

It may in some embodiments be necessary to arrange heat transfer zones and conduit zones in the same part of the return duct 16, the heat transfer surfaces 38 then being arranged directly in front of the inlet conduits 50. Transport gas flows through nozzles 52, 54, 56, 68 and 70 would then effect both heat transfer and transport of particles.

Figure 3:
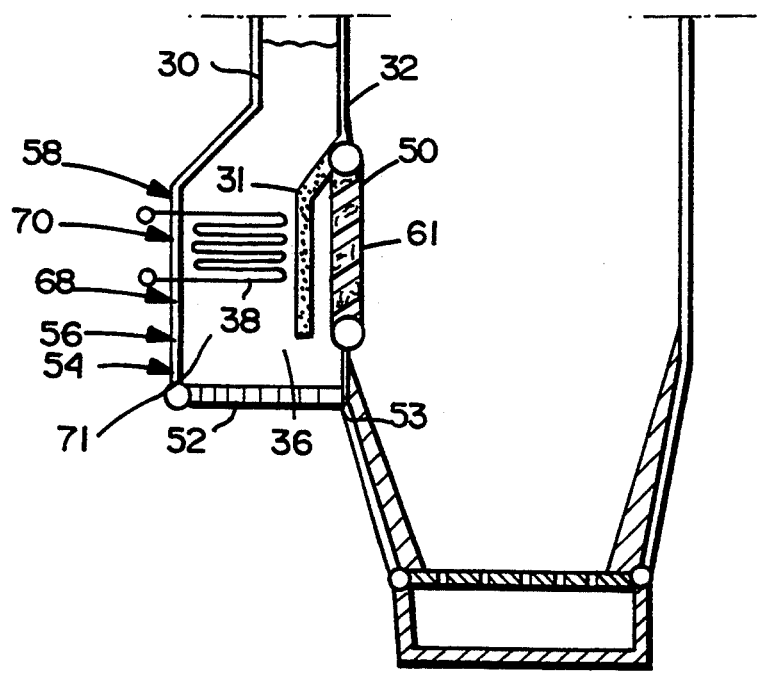

Transport of particles may however be controlled separately from heat transfer by arranging a primarily vertical partition wall 31 in front of the inlet conduits 50, for separating the bed 36 in a heat transfer section 61 and a transport section 71 as seen in FIG. 3. The partition wall 31 reaches from the return duct wall 32 downwardly below the inlet conduits 50 and is arranged between the heat transfer surfaces 38 and inlet conduits 50. Transport gas is then preferably introduced through nozzles 53 directly below the transport zone or through nozzles (not shown) arranged in the partition wall 31. Gas introduced through nozzles 54,56,68 and 70 will effect the heat transfer but have little or no affect on the transport of particles. Gas introduced through nozzles 56, 58, 68 and 70 will flow upwardly in the return duct if no gas seal is arranged in the duct.

FIG. 4 illustrates an embodiment of the present invention, according to which heat recovery from particles flowing downwardly along the side walls 22 of the combustion chamber 12 is obtained. In FIG.4 the same reference numerals as in FIG.1 and FIG.3 have been used where applicable.

In FIG. 4, the return duct 16, may or may not have heat transfer surfaces arranged therein or heat may be recovered only through membrane walls 30 and 32 of the return duct 16. A partition wall 124 is arranged inside the combustion chamber 12 close to the wall 22, thereby forming a pocket 135 (or return duct) construction close to the wall 22, in which case the return duct 35 is a second return duct. Particles flowing downwardly along the upper part of wall 22 fall down into the pocket 135 and form a bed 136 of particles therein. Particles are recycled from the pocket 135 into the combustion chamber 12 through inlet conduits 150, similar to inlet conduits 50. Transport gas is introduced through nozzles 152, 156 and 158.

A heat transfer surface 138, e.g- a superheater, is arranged in the pocket 135. The heat transfer surfaces 138 may be arranged in heat transfer zones adjacent to transport zones similar to the FIG. 2 construction. The side wall 22 may be as shown in FIG.4, bent outwardly to increase the cross section of the lower portion of the pocket 135. Nozzles 152, 168 and 170 for controlling the heat transfer may be arranged in the bottom of the pocket 135 or in the side wall 22.

FIG. 5 shows an embodiment of the present invention in which particles collected in a return duct 16 and additionally in a recycling (second return) duct 135' are gathered in a common bed 34'. At high loads the recycling of particles through duct 135' into the bed 34' may be prevented and mainly particles recycled through the return duct are used to form the bed 34'. The flow of particles through the internal recycling duct 135' may be controlled by a valve preventing particles from flowing from the duct into the bed, or by controlling the fluidization in the combustion chamber 12 in the vicinity of the partition wall 124. At low load particles may mainly flow through recycling duct 135' providing enough particles into heat transfer zones in the bed 34'.

While the invention has been described in connection with what is presently considered to be most practical and preferred embodiments of the invention, it is to be understood that the invention is not to be limited to the disclosed embodiments, but on the contrary, is intended to cover various modifications and equivalent arrangements included within the spirit and scope of the appended claims.

I claim:

1. A method of operating a circulating fluidized bed reactor system, utilizing a combustion chamber, having a fluidized bed of particles therein, a particle separator connected to a discharge opening in the upper part of the combustion chamber, a return duct connected in its upper part to the particle separator and in its lower part to the combustion chamber through two or more inlets disposed one on top of the other and including a top inlet, and a gas outlet in the particle separator, the method comprising the steps of:
   (a) establishing a fast fluidized bed of solid particles in the combustion chamber so that a particle suspension comprising flue gases and solid particles entrained therein is caused to flow upwardly in the combustion chamber,
   (b) collecting solid particles separated from the gas and particle suspension,
   (c) directing the collected solid particles into the return duct,
   (d) establishing a bed of solid particles in the return duct immediately in front of the inlets and having an upper surface above the top inlet to provide a gas seal to substantially prevent the passage of gas through the inlets, and
   (e) introducing transporting gas into the bed of solid particles in the return duct to effect recycling of particles from the bed through the inlets into the combustion chamber.

2. A method as recited in claim 1 wherein the bed of particles is separated into transport and heat transfer sections, and wherein step (e) is practiced to transport the particles from the transport section into the heat transfer section, and from there through the inlets into the combustion chamber.

3. A method as recited in claim 1 wherein step (e) is practiced by introducing transporting gas with a velocity of <0.5 m/s in the return duct, to establish a slowly bubbling fluidized bed at least in a part of the return duct.

4. A method as recited in claim 1 wherein step (e) is practiced by introducing at least some of the transporting gas into the bed in a horizontal direction to thereby move the bed particles toward the inlets.

5. A method as recited in claim 1 comprising the further step of controlling the level of the upper surface of the bed of solid particles in the return duct by controlling the amount of transporting gas introduced into the return duct in step (e).

6. A method as recited in claim 1 comprising the further step of controlling the level of the upper surface of the bed of solid particles by measuring the pressure difference in the return duct between a first preset level below the upper surface of the bed and another second preset level above the upper surface of the bed, the two levels being chosen to include there between both the actual and optimal levels of the upper surface, and by controlling the introduction of transporting gas in step (e) in response the pressure difference between the first and second levels.

7. A method as recited in claim 1 comprising the further step of recovering heat from the system by circulating heat transfer fluid into heat transfer association with the bed of solid particles in a heat transfer zone in the return duct.

8. A method as recited in claim 7 comprising the further step of evaporating or superheating steam in the return duct with evaporators or superheaters disposed in the return duct.

9. A method as recited in claim 7 comprising the further step of controlling the heat recovery in the heat transfer zone by introducing a flow of fluidizing gas through at least a portion of the heat transfer zone.

10. A method as recited in claim 9 comprising the further step of controlling the heat recovery by controlling the location of the fluidizing gas flow introduced into the heat transfer zone, or by controlling the flow rate of the fluidizing gas introduced into the heat transfer zone, or by controlling both the location and flow rate of fluidizing gas.

11. A method as recited in claim 9 comprising the further step of introducing at least a portion of the fluidizing gas flow at at least two different levels into the heat transfer zone and controlling the heat recovery in the heat transfer zone by controlling the proportion of gas introduced at different levels.

12. A method as recited in claim 9 comprising the further step of introducing at least a portion of the fluidizing gas flow into the heat transfer zone and another portion into the vicinity of the inlets and controlling the heat recovery in the heat transfer zone by controlling the proportion of gas introduced into the heat transfer zone.

13. A method as recited in claim 9 comprising the further step of controlling the height of the bed of solid particles so as to prevent the main portion of fluidizing gas introduced into the recycling duct from flowing into the upper part of the return duct above the bed surface.

14. A method as recited in claim 1 comprising the further step of recycling solid particles separated in the particle separator through a second return duct into the combustion chamber.

15. A method as recited in claim 1 comprising the further step of collecting solid particles accumulating as a downward particle flow on the walls of the combustion chamber, introducing the collected particles into the return duct and recycling the particles from the return duct into the combustion chamber.

16. A method as recited in claim 1 wherein steps (a)–(e) are practiced to establish in the return duct a bed of particles having a smaller mean size distribution than particles in the combustion chamber.

17. A method as recited in claim 1 wherein step (e) is practiced utilizing gas selected from the group consisting essentially of air, inert gas, and recycled flue gas.

18. A circulating fluidized bed reactor system, comprising:
a combustion chamber, having a fast fluidized bed of particles therein and a discharge opening in an upper part thereof,
a particle separated connected to the discharge opening in the upper part of the combustion chamber,
a return duct having an upper part connected to the particle separator and a lower part connected to the combustion chamber,
a gas outlet in the particle separator,
said return duct including means for collecting solid particles separated from a particle suspension flowing upwardly in the combustion chamber to establish a bed of solid particles in said return duct, the bed having an upper surface;
inlet means, comprising at least two horizontal or inclined slot-like inlet openings disposed one on top of the other, and including a top inlet, connecting the lower part of said return duct with the combustion chamber, said top inlet being disposed in said return duct at a level below the level of the upper surface of the bed of solid particles so that the particles engage the return duct at the inlet and substantially prevent the passage of gas through the inlets, providing a gas seal; and
transporting gas nozzles disposed in operative association with the lower part of the return duct, for transporting particles from the bed towards the inlet means for discharging particles from the return duct into said combustion chamber.

19. A fluidized bed system as recited in claim 18 wherein said at least two inlet openings are disposed in a common wall between said return duct and said combustion chamber.

20. A fluidized bed system as recited in claim 18 wherein said two or more horizontal or inclined slot like inlet openings are disposed in a common wall between said combustion chamber and said return duct.

21. A fluidized bed system as recited in claim 20 wherein said horizontal or inclined slot like openings are of a gill-type construction.

22. A fluidized bed system as recited in claim 20 wherein said inlet openings are defined by refractory material.

23. A fluidized bed system as recited in claim 20 wherein said inlet includes an opening formed by bending apart water tubes in a common membrane wall between said combustion chamber and said return duct.

24. A fluidized bed system as recited in claim 18 further comprising heat transfer surface disposed in the bed in said return duct.

25. A fluidized bed system as recited in claim 24 further comprising a superheater and/or evaporator disposed in the bed in said return duct.

26. A fluidized bed system as recited in claim 24 further comprising gas nozzles disposed in said return duct, for fluidizing the bed of solid particles.

27. A fluidized bed system as recited in claim 26 wherein said transporting gas nozzles are disposed at two or more levels in said return duct, for controlling heat transfer.

28. A fluidized bed system as recited in claim 26 including one or more inlet conduits disposed in the common wall between said combustion chamber and said return duct in inlet conduits zones in the duct; heat transfer surfaces disposed in heat transfer zones at a distance from the inlet conduit zones; and gas introducing nozzles disposed in both inlet conduit zones and heat transfer zones for controlling heat transfer.

29. A fluidized bed system as recited in claim 18 further comprising a second return duct, disposed adjacent a wall inside said combustion chamber, for collecting particles separated from the upwardly flowing gas and particle suspension and flowing downwardly along the wall.

30. Method of operating a circulating fluidized bed reactor system, utilizing a combustion chamber, having a fluidized bed of particles therein, a particle separator connected to a discharge opening in the upper part of the combustion chamber, a return duct connected in its upper part to the particle separator and in its lower part to the combustion chamber through inlets, the inlets comprising two or more horizontal or inclined slot-like openings disposed one on top of the other and opening directly into the combustion chamber from the return duct, and a gas outlet in the particle separator, the method comprising the steps of:
(a) establishing a fast fluidized bed of solid particles in the combustion chamber so that a particle suspension comprising flue gases and solid particles entrained therein is caused to flow upwardly in the combustion chamber,
(b) collecting solid particles separated from the gas and particle suspension,
(c) directing the collected solid particles into the return duct,
(d) establishing a bed of solid particles in the return duct to provide a gas seal, and ensuring that the bed of particles is above all of the horizontal or inclined slot-like openings, and
(e) introducing transporting gas into the return duct, for recycling particles from the bed through the horizontal or inclined slot-like openings into the combustion chamber, to introduce particles directly from the bed into the combustion chamber.

31. A circulating fluidized bed reactor system, comprising:
a combustion chamber, having a fast fluidized bed of particles therein and a discharge opening in an upper part thereof,
a particle separator connected to the discharge opening in the upper part of the combustion chamber,
a return duct having an upper part connected to the particle separator and a lower part connected to the combustion chamber,
a gas outlet in the particle separator,
said return duct including means for collecting solid particles separated from a particle suspension flowing upwardly in the combustion chamber to establish a bed of solid particles in said return duct,
inlet means, comprising at least two superimposed inlet openings, connecting the lower part of said return duct with the combustion chamber,
transporting gas nozzles disposed in operative association with the lower part of the return duct, for transporting particles from the bed towards the inlet means for discharging particles from the return duct into said combustion chamber; and
a second return duct, disposed adjacent a wall inside said combustion chamber, for collecting particles separated from the upwardly-flowing gas and particle suspension and flowing downwardly along the wall.

32. A method of operating a circulating fluidized bed reactor system, utilizing a combustion chamber, having a fluidized bed of particles therein, a particle separator connected to a discharge opening in the upper part of the combustion chamber, a return duct connected in its upper part to the particle separator and in its lower part to the combustion chamber through inlets, and a gas outlet in the particle separator, the method comprising the steps of:

(a) establishing a fast fluidized bed of solid particles in the combustion chamber so that a particle suspension comprising flue gases and solid particles entrained therein is caused to flow upwardly in the combustion chamber, (b) collecting solid particles separated from the gas and particle suspension, (c) directing the collected solid particles into the return duct, (d) establishing a bed of solid particles in the return duct having the level of its upper surface above the level of the inlets, to provide a gas seal, and (e) introducing transporting gas with a velocity of <0.5 m/s into the bed of solid particles in the return duct to effect recycling particles from the bed through the inlets into the combustion chamber, and to establish a slowly bubbling fluidized bed at least in a part of the return duct.

* * * * *